US006776546B2

United States Patent
Kraus et al.

(10) Patent No.: US 6,776,546 B2
(45) Date of Patent: Aug. 17, 2004

(54) METHOD AND SYSTEM FOR USING A KEYBOARD OVERLAY WITH A TOUCH-SENSITIVE DISPLAY SCREEN

(75) Inventors: Mark Gerard Kraus, Redmond, WA (US); Vu Xuan Nguyen, Seattle, WA (US); Martin Shetter, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/177,952

(22) Filed: Jun. 21, 2002

(65) Prior Publication Data

US 2003/0235452 A1 Dec. 25, 2003

(51) Int. Cl.[7] .................................................. B41J 5/28
(52) U.S. Cl. ........................ 400/472; 400/489; 345/172
(58) Field of Search ................................ 400/472, 489; 345/172

(56) References Cited

U.S. PATENT DOCUMENTS

| | | | | |
|---|---|---|---|---|
| 3,810,317 A | * | 5/1974 | Rosenbaum et al. | ......... 434/325 |
| 3,971,013 A | | 7/1976 | Challoner et al. | |
| 4,931,782 A | * | 6/1990 | Jackson | ....................... 345/174 |
| 5,486,846 A | * | 1/1996 | Comer et al. | ............... 345/168 |
| 5,581,243 A | * | 12/1996 | Ouellette et al. | ............ 345/173 |
| 5,801,941 A | | 9/1998 | Bertram | |
| 5,805,157 A | | 9/1998 | Bertram et al. | |
| 5,821,881 A | | 10/1998 | Fischer et al. | |
| 5,909,211 A | * | 6/1999 | Combs et al. | ............... 345/172 |
| 5,936,614 A | * | 8/1999 | An et al. | ..................... 345/173 |
| 6,115,616 A | | 9/2000 | Halperin et al. | |
| 6,121,960 A | * | 9/2000 | Carroll et al. | ............... 345/173 |
| 6,301,626 B1 | * | 10/2001 | Knox | ........................... 710/10 |
| 2003/0197687 A1 | * | 10/2003 | Shetter | ........................ 345/173 |

* cited by examiner

Primary Examiner—Charles H. Nolan, Jr.
(74) Attorney, Agent, or Firm—Leydig, Voit & Mayer, Ltd.

(57) ABSTRACT

Disclosed is a "keyboard overlay" that sits on top of a touch-sensitive display screen of a computing device. After aligning the overlay on the display screen, the user types on the overlay. When the user presses a key on the overlay, the pressure is transmitted to the display screen below. That pressure is registered by the display screen as a touch. The keyboard overlay is formed to provide tactile finger-position feedback so that a user can keep his fingers oriented properly over the keyboard. The overlay may be opaque with keycap information displayed in the key areas. The overlay may be transparent, allowing a user to see a virtual keyboard painted on the display screen below. The computing device can detect the presence and type of an overlay. Applications may respond differently to different types of overlays. Different applications may be invoked depending upon the type of overlay detected.

23 Claims, 10 Drawing Sheets

METHOD AND SYSTEM FOR USING A KEYBOARD OVERLAY WITH A TOUCH-SENSITIVE DISPLAY SCREEN

CROSS-REFERENCE TO RELATED APPLICATION

The present application is related to the patent application "Virtual Keyboard for Touch-Typing Using Audio Feedback," filed Apr. 18, 2002, LVM docket number 214676.

TECHNICAL FIELD

The present invention is related generally to touch-sensitive display screens, and, more particularly, to providing feedback to a user of a touch-sensitive display screen.

BACKGROUND OF THE INVENTION

Many computing applications require some amount of data entry. Some applications call for only a very limited number of characters, such as when a user enters a password or a PIN. Other applications, for example word processing or e-mail, require the user to enter extended amounts of data. For these latter applications, the keyboard reigns as the supreme data-entry device. Its design has been fashioned over more than a century to take advantage of people's nature manual dexterity. Today, typing on a keyboard is a common skill, and its supporting hardware and software are standardized and cheap.

Recently, small portable computing devices that support some form of data entry have become common. Such devices, typically smaller than a laptop computer, include, for example, cellular telephones, two-way pagers, and personal digital assistants. Often, these devices include a touch-sensitive display screen that serves both to display output from the computing device to its user and to receive input from the user. For some applications, the user "writes" with a stylus on the screen. The user's handwriting is decoded and becomes input to the computing device. In other applications, the user's input options are displayed as control icons on the screen. When the user selects an option by touching the icon associated with the option, the computing device detects the location of the touch and sends a message to the application or utility that presented the icon.

These devices often do not include a keyboard. To enter text, a "virtual keyboard," typically a set of icons that look like the keycaps of a traditional keyboard, are painted on the screen. The user "types" by successively touching areas on the screen associated with specific keycap icons. This method works well for applications that require minimal data entry and where speed of entry is not a concern.

However, advancing data processing and communications technologies are enabling these small portable devices to support more sophisticated applications, specifically applications that call for extended data entry. As one interesting example, consider a recently introduced tablet-like detachable monitor supported by a host computing device, the host typically a personal computer (PC) sitting in a fixed location. The tablet has a touch-sensitive display screen. The tablet, once detached from the host, communicates wirelessly with the host and operates as a portable input/output device. A user carries the tablet around an office or home, using the tablet to gain access to applications running on the fixed-location host. Some of these applications, for example e-mail, word processing, and Web browsing, require extended text entry.

As experience with this tablet and with other increasingly capable portable devices has hinted, extensive data entry would be facilitated by a more robust data-entry mechanism than a stylus (or finger) on a virtual keyboard. Extensive typing on a virtual keyboard is a slow and tedious process, partly because a user must continually correct the position of his fingers over the keycap icons. A traditional hardware keyboard provides finger-positioning feedback via the indented surfaces of the keys. Touch-sensitive display screens are flat to allow good viewing, but their flatness does not provide such tactile feedback. As another hindrance to quick typing, these screens are also quite rigid with essentially no "give" to tell the user that a virtual key has been pressed.

Several attempts have been made to add a hardware keyboard to a small portable device, but none of these attempts has led to a satisfactory mechanism for extended data entry. One problem lies in the size of the hardware keyboard: full-size keyboards are cumbersome to carry around, detracting from the very portability that defines these devices, while smaller keyboards, useful for limited data-entry applications, do not comfortably accommodate the human hand to allow for rapid and extended typing.

What is needed is a way to make a touch-sensitive display screen into a more acceptable extended data-entry device. The utility of such a device would not be limited to portable display devices, but would enhance the experience of entering data on any touch-sensitive display screen.

SUMMARY OF THE INVENTION

In view of the foregoing, the present invention provides a "keyboard overlay" that sits on top of a touch-sensitive display screen of a computing device. After aligning the keyboard overlay on the display screen, the user types on the keyboard overlay. When the user presses a key on the keyboard overlay, the pressure is transmitted to the touch-sensitive display screen below. That pressure is registered by the display screen as a touch. The keyboard overlay is formed to provide tactile finger-position feedback so that a user can keep his fingers oriented properly over the keyboard. Some embodiments additionally supply feedback when the user presses a key hard enough to register on the display screen. The keyboard overlay, in combination with the touch-sensitive display screen, allows the user to type almost as conveniently and as quickly as on a traditional hardware keyboard.

In some embodiments, the keyboard overlay is formed from an opaque, rubbery plastic. Keycap information is displayed in the key areas of the overlay. In other embodiments, the overlay is transparent, allowing a user to see a virtual keyboard painted on the touch-sensitive display screen below. Some applications may blend the virtual keyboard display with other display information below the keyboard overlay.

When not in use, the keyboard overlay is removed from the touch-sensitive display screen. Flexible embodiments of the keyboard overlay may be rolled up, and rigid embodiments may be stored on a pocket of the computing device.

The touch-sensitive display screen can continue to operate as it always has, and the computing device need not even be aware of the presence of the keyboard overlay. If, however, the computing device becomes aware of the presence of the keyboard overlay, then it can modify its behavior accordingly. For example, an application running on the computing device can switch to a text-entry mode when a keyboard overlay is detected. As part of the switch, the application can paint a virtual keyboard under the keyboard overlay that matches the size and key positions of the overlay. The application moves other display information to parts of the screen not covered by the overlay.

In some embodiments, the computing device knows not only that a keyboard overlay is present, but also knows the type of the overlay. In one embodiment, the keyboard overlay contains active or passive electronic components (for example, wire jumpers, resistors, or even an electronic chip) that are powered by the computing device when the overlay is put in place. The computing device queries the electronic components to know the type of the overlay. Applications may respond differently to different types of overlays. Further, different applications may be invoked depending upon the type of overlay detected. For example, an overlay that looks the keypad of a calculator may bring up a calculator application designed to work with that keypad.

Some embodiments of the keyboard overlay incorporate a rigid frame in addition to soft plastic key areas. The frame serves to align the keyboard overlay with respect to the touch-sensitive display screen and physically isolates each key area from its neighbors, preventing pressure on one key area from blurring over into adjacent key areas.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the environment surrounding the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 1:
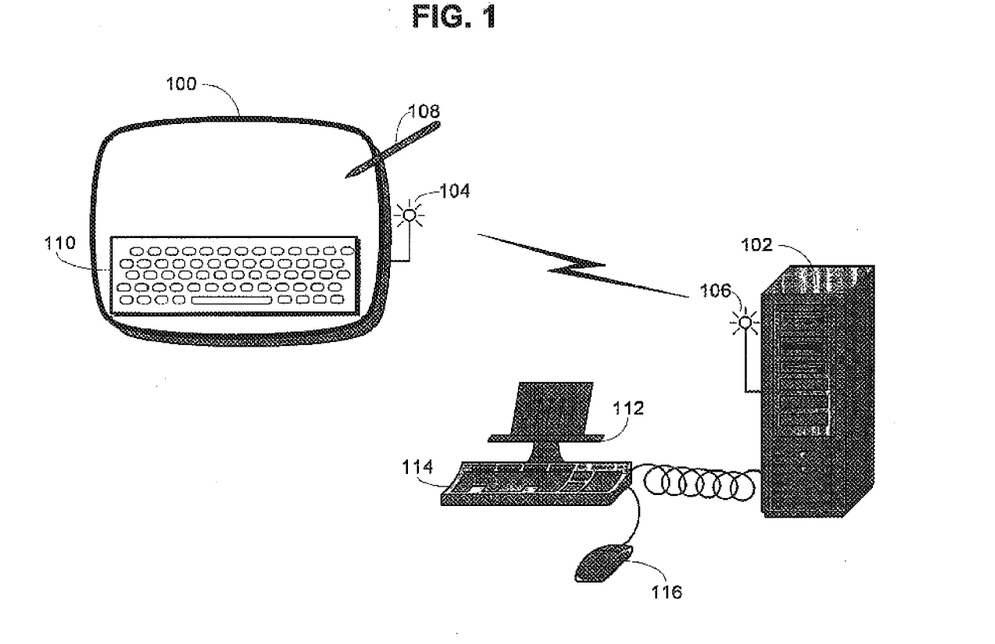
FIG. 1 is a block diagram showing an exemplary computing environment with a keyboard overlay sitting on top of a touch-sensitive display screen of a portable tablet.

A keyboard overlay according to the principles of the present invention may be developed for use with any touch-sensitive display screen. FIG. 1 presents a specific example of a computing environment with such a display screen. In FIG. 1, a portable, interactive display device or "tablet" 100 communicates with a host computing device 102 via a wireless communications channel, here illustrated by a radio antenna 104 on the portable tablet 100 and by another antenna 106 on the host 102. The portable tablet 100 has a touch-sensitive display screen by means of which the portable tablet 100 presents to its user a graphical user interface of the host 102. The user sends input to the host 102 by touching the display screen with a stylus 108 or with a keyboard overlay 110. The portable tablet 100 may support other input and output peripherals (not shown) including a mouse, speaker, camera, and the like. The portable tablet 100 is of the type disclosed in U.S. patent application Ser. No. 09/784,716, "Methods and Systems for a Portable, Interactive Display Device for Use with a Computer," which is incorporated herein by reference in its entirety.

The host computing device 102 is separate from the portable tablet 100 and usually sits in a fixed location. The host 102 may support any number of peripherals, here illustrated by a hardware keyboard 114 and a mouse 116 attached to the host by a wired communications channel. The host 102 provides storage space, access to its own peripheral devices, and processing to run applications. The portable tablet 100 need only provide the amount of processing necessary to communicate with the host 102, to run the client side of the hosting software, and to provide security functions.

The portable tablet 100 operates in two modes: untethered, as described above, and tethered. The untethered mode is limited by the bandwidth and range of the wireless communications channel. The host computing device 102 provides a docking station 112 that accommodates the portable tablet 100. When in the docking station, the portable tablet 100 switches to tethered mode. In this mode, the portable tablet 100 operates as a display for the host 102 and communicates with the host 102 through connectors on the docking station 112 rather than through the wireless channel. This allows for a higher quality video connection. In FIG. 1, the docking station 112's connection to the host 102 is by way of a wired communications channel. Other communications options are possible. The docking station 112 may provide power to run the portable tablet 100 and to recharge its batteries.

Figure 2A:
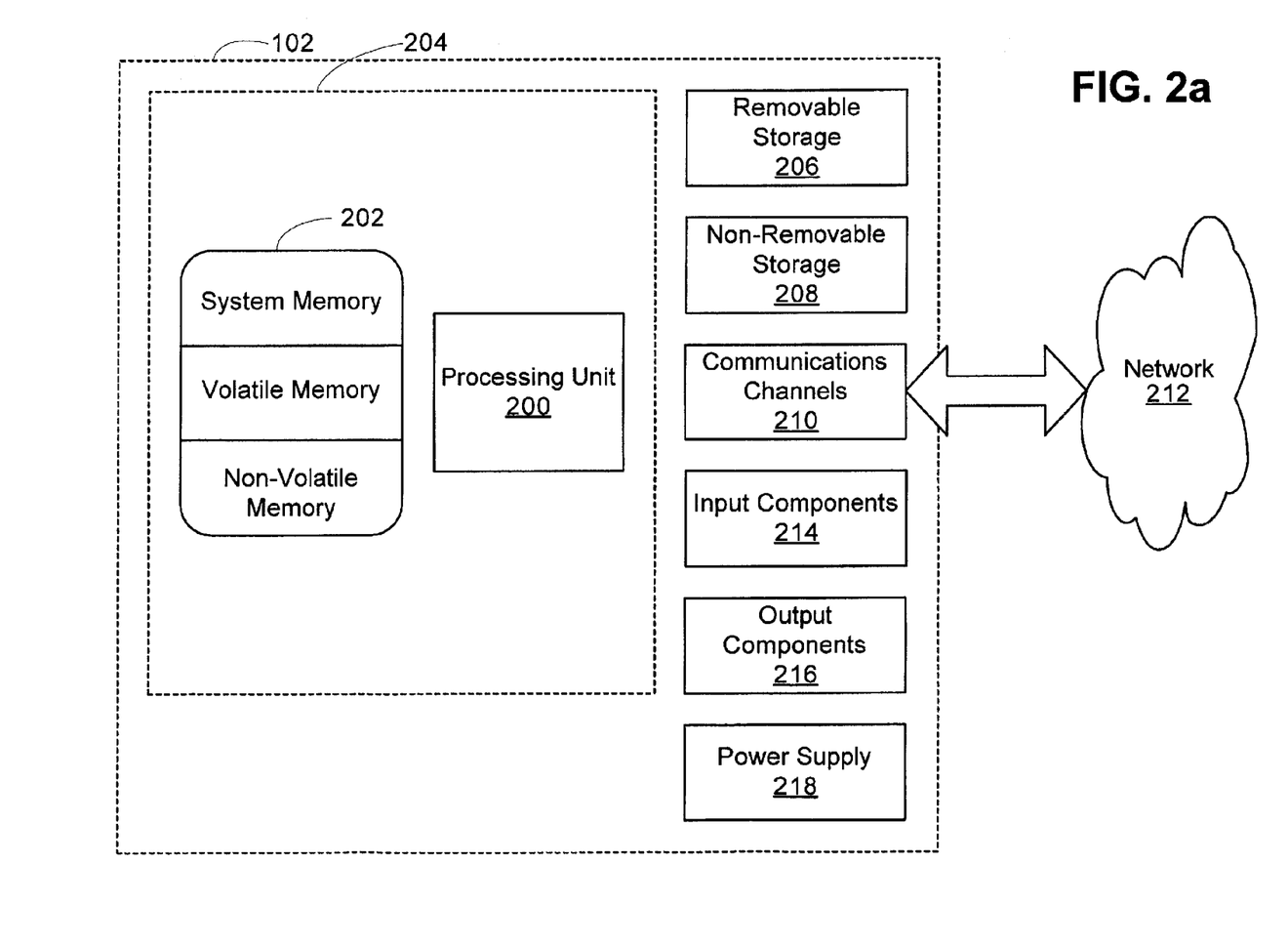
FIG. 2a is a schematic diagram generally illustrating an exemplary computing system that supports the present invention and FIG. 2b is a schematic diagram showing an exemplary software environment for a portable tablet that supports the present invention.

The portable tablet 100 and the host computing device 102 of FIG. 1 may be of any architecture. FIG. 2a is a block diagram generally illustrating an exemplary computer system that supports the present invention. The computer system of FIG. 2a is only one example of a suitable environment and is not intended to suggest any limitation as to the scope of use or functionality of the invention. Neither should the portable tablet 100 or the host 102 be interpreted as having any dependency or requirement relating to any one or combination of components illustrated in FIG. 2a. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In their most basic configurations, the portable tablet 100 and the host 102 typically include at least one processing unit 200 and memory 202. The memory 202 may be volatile (such as RAM), non-volatile (such as ROM or flash memory), or some combination of the two. This most basic configuration is illustrated in FIG. 2a by the dashed line 204. The portable tablet 100 and the host 102 may have additional features and functionality. For example, they may include additional storage (removable and non-removable) including, but not limited to, magnetic and optical disks and tape. Such additional storage is illustrated in FIG. 2a by removable storage 206 and by non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the portable tablet 100 or by the host 102. Any such computer-storage media may be part of the portable tablet 100 or the host 102. The portable tablet 100 and the host 102 may also contain communications channels 210 that allow them to communicate with other devices, including devices on a network 212. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include optical media, wired media, such as wired networks and direct-wired connections, and wireless media such as acoustic, RF, infrared, and other wireless media. The term "computer-readable media" as used herein includes both storage media and communications media. The portable tablet 100 and the host 102 may also have input devices 214 such as a touch-sensitive display screen, a stylus 108, a keyboard overlay 110, a hardware keyboard 114, a mouse 116, a voice-input device, etc. Output devices 216 include the devices themselves, such as the touch-sensitive display screen, speakers, and a printer, and rendering modules (often called "adapters") for driving these devices. All these devices are well know in the art and need not be discussed at length here. The portable tablet 100 and the host 102 each has a power supply 218. On the portable tablet 100, the power supply 218 includes a battery and may include circuitry for recharging the battery whenever the portable tablet 100 is in the docking station 112.

Figure 2B:
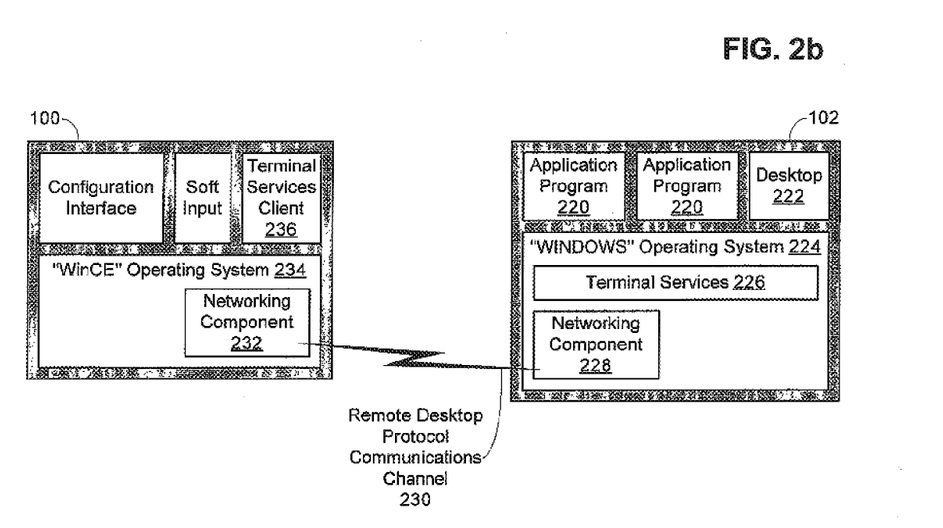

When operating in untethered mode, the portable tablet 100 is supported by software that projects the user interface of the host computing device 102 to the portable tablet 100. The software also accepts user input from the portable tablet 100 and sends it to the host 102. As an example of this software, FIG. 2b is a block diagram of Microsoft's "WINDOWS TERMINAL SERVICES." An application program 220 running on the host 102 sends its output to the operating system 224 intending that the output be displayed in one or more windows managed by the Desktop 222. If the user of the application program 220 is using a portable tablet 100, however, the Terminal Services software component 226 intercepts the display output, reformats it, and delivers it to the Networking software component 228 for transport to the portable tablet 100. The display information is transported to the portable tablet 100 by a standard protocol such as Microsoft's Remote Desktop Protocol 230 or by the Independent Computing Architecture protocol. These protocols allocate the limited bandwidth of the wireless communications channel, an especially important consideration when a bandwidth-intensive peripheral, such as a camera, is attached to the portable tablet 100. When the display information reaches the Networking component 232 on the portable tablet 100, it is passed to the Terminal Services Client component 236. That component interprets the information and displays it on the touch-sensitive display screen of the portable tablet 100. This procedure is reversed for input generated on the portable tablet 100, such as by use of the stylus 108 or of the keyboard overlay 110. The user input is presented to the application program 220 as if it were generated locally on the host 102. Note that FIG. 2b is for illustrative purposes only, and the invention is not limited to the specific software components and protocols shown. In particular, the portable tablet 100 may run an operating system entirely different from that of the host 102. The standard display protocol hides implementation differences. The protocols and transport methods used to carry the display information are chosen to suit particular needs. For example, protocols TCP/IP, SPX, IPX, and NetBEUI may each be appropriate in certain situations. Appropriate transport methods include infrared and short-range radio such as Bluetooth, IEEE's 802.11b, and IEEE 1394 Firewire.

Typically, touch-sensitive display screens are made up of a touch-sensor component constructed over a display component. The display component (see item 302 of FIGS. 3b through 3d) displays images in a manner similar to that of a typical monitor on a personal computer. A portable tablet 100 would probably use a liquid crystal display because of that display's low weight and small depth. Other display technologies are possible such as, for example, cathode ray tubes, plasma screens, electro-luminescent screens, and organic light-emitting diodes. The touch sensor (see item 304 of FIGS. 3b through 3d) sits on top of the display component 302. The touch sensor 304 is transparent so that the display may be seen through it. Many touch-sensor technologies are known in the art, including four-, five-, and eight-wire resistive, capacitive, near field, optical, and acoustic wave. The keyboard overlay 110 may be used with any type of display component 302 and any type of touch sensor 304.

When a user touches the touch-sensitive display screen, whether with the stylus 108, with the keyboard overlay 110, or with a finger, a touch-screen controller detects the touch, determines its location on the display screen, and sends that information to the operating system 234 of the portable tablet 100. If the touch is on an area controlled by the operating system 234 (for example, on a configuration menu for the portable tablet 100), then the operating system 234 processes the touch. If, on the other hand, the touch is on an area controlled by the host computing device 102, then the location of the touch is sent to the operating system 224 of the host 102. As appropriate, the touch is either processed by the host 102's operating system 224 or sent for processing to an application program 220 running on the host 102.

Figure 3A:
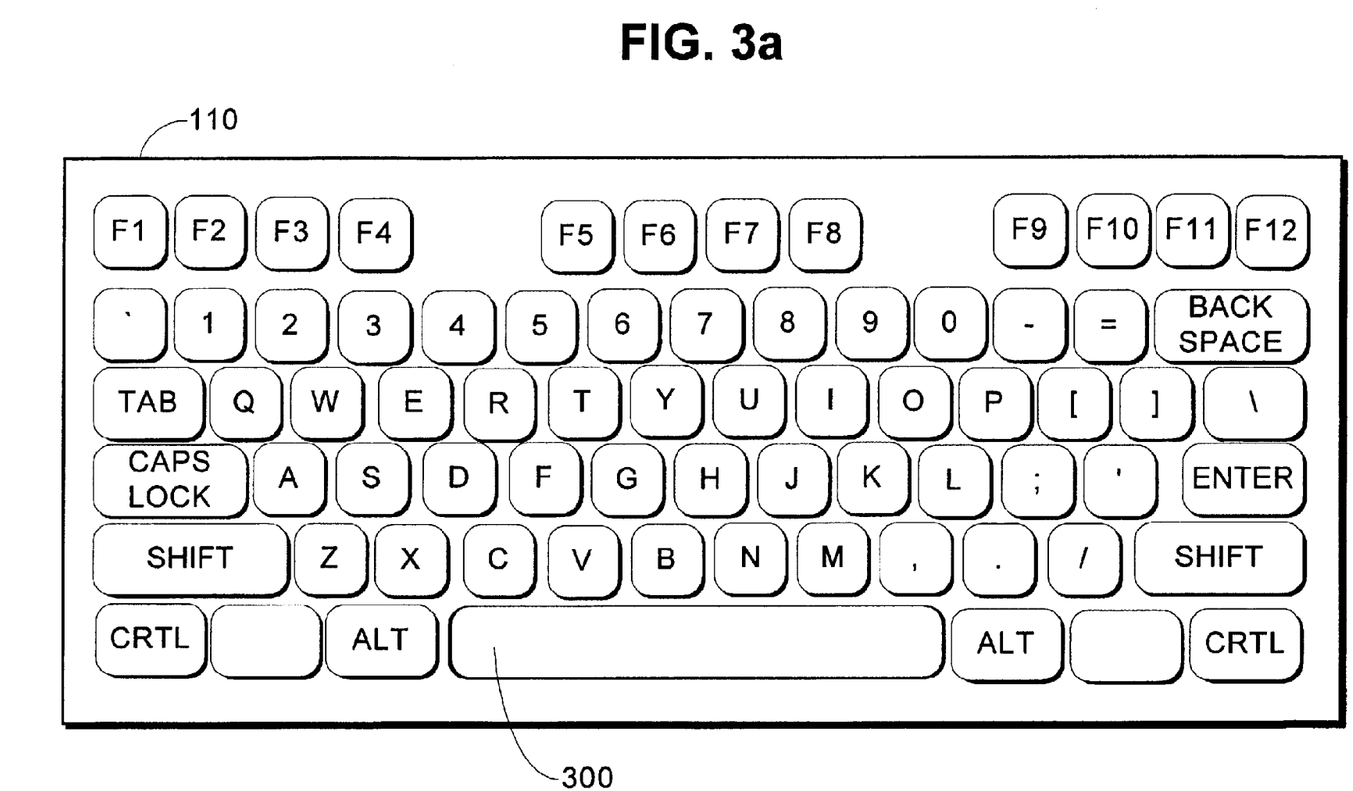
FIG. 3a is a top-view schematic diagram of an exemplary keyboard overlay.

FIGS. 3a through 3d and FIG. 4 show details of some embodiments of the keyboard overlay 110. FIG. 3a presents a top view of a typical keyboard overlay 110. The key areas 300 of this particular keyboard overlay 110 are arranged in the manner of the familiar "QWERTY" keyboard. Another embodiment of the keyboard overlay 110 mimics a numerical entry pad. More specialized keyboard overlays 110 may be created for use with particular application programs. For example, the key areas 300 of the keyboard overlay 110 may present the entry functions of a scientific calculator. The present invention is not limited to any particular arrangement of the key areas 300, but contemplates all possible arrangements as may come within the scope of the following claims and equivalents thereof.

Figure 3B:
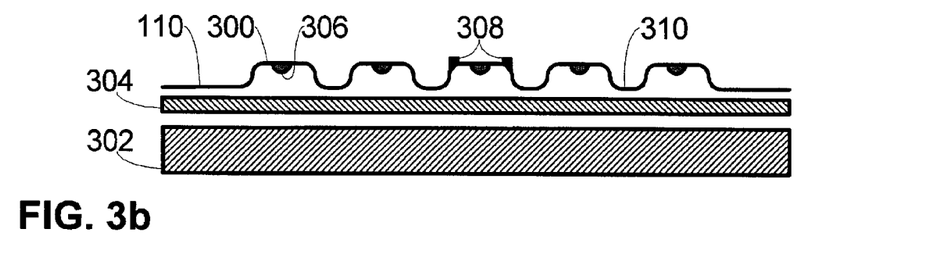
FIG. 3b is a cross-sectional view of a keyboard overlay with no keys depressed.
Figure 3C:
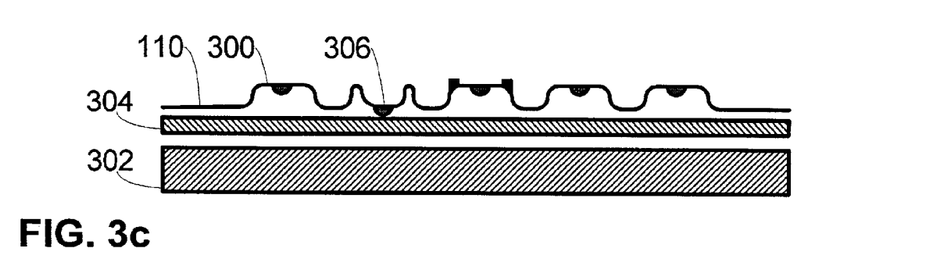
FIG. 3c is a cross-sectional view of a keyboard overlay with one key depressed.
Figure 3D:
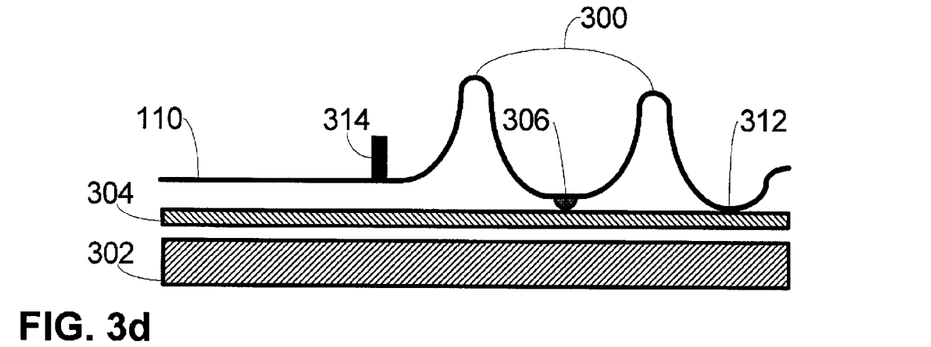
FIG. 3d is a cross-sectional view of a keyboard overlay with a rigid frame and with one key depressed.

FIGS. 3b through 3d show cross-sections of a keyboard overlay 110 in place over a touch-sensitive display screen. As discussed above, the display screen is made up of a display component 302 and a touch sensor 304. In some embodiments, the keyboard overlay 110 is made from a sheet of flexible material. Suitable materials include, for example, thermo-formed plastic, molded silicon rubber, neoprene, and other pliable plastic- or rubber-based compounds. In the embodiments of FIGS. 3b through 3d, beneath each key area 300 is attached a display actuator 306. The display actuator 306 may be simply the bottom of a sheet of material that forms the keyboard overlay 110. In other embodiments, the keyboard actuator 306 is made of a material harder than the sheet.

One of the functions of the keyboard overlay 110 is to provide a user with finger-position feedback. Two of many possible mechanisms for providing such feedback are shown in FIG. 3b. First, a key area 300 is surrounded by a ridge 308. Second, the key areas 300 are raised relative to the "valleys" 310 between the key areas 300. These features allow the user to feel whether or not his fingers are properly oriented over the key areas 300. Other possible feedback mechanisms include a raised spot on one or more of the key areas 300 and a depressed crown of the key areas 300.

FIG. 3c shows how the keyboard overlay 110 transmits pressure from a user's finger into a touch on the touch-sensitive display screen. When the user presses a key area 300, the key area 300 "collapses" or deforms until the display actuator 306 comes into contact with the touch sensor 304 of the display screen. In the embodiment of FIG. 3c, the display actuator 306 concentrates the pressure of the user's finger into a small, well defined area on the touch sensor 304. This concentration allows a touch-screen controller to better locate the touch than is possible with a finger directly touching the touch sensor 304.

FIG. 3d illustrates a characteristic of some embodiments of the keyboard overlay 110 and a mechanism for alleviating problems associated with that characteristic. FIG. 3d is a magnified cross-sectional view of a depressed key area 300. First consider the right side of the depressed key area 300. Because the keyboard overlay 110 is flexible, the pressure on the key area 300 causes the keyboard overlay 110 to flex downward. As expected, this flexing allows the display actuator 306 to touch the touch sensor 304. However, in this particular embodiment, the keyboard overlay 110 is so flexible that an energetic push on the key area 300 also causes the keyboard overlay 110 to flex downward until it touches the touch sensor 304 at point 312. This additional touch 312 may be strong enough to be detected by the touch-screen controller. The touch-screen controller becomes confused because there are two simultaneous touches. The touch-screen controller either produces invalid touch-location information or discards both touches. Either possibility confuses and slows down a user typing on the keyboard overlay 110.

There are several possible mechanisms for preventing the problem illustrated on the right side of the depressed key area 300 of FIG. 3d. For example, the flexible keyboard overlay 110 may be formed to be less flexible (possibly thicker) in the regions 310 between the key areas 300. Another possibility is illustrated on the left side of the depressed key area 300 of FIG. 3d. A rigid frame 314 is attached to the flexible keyboard overlay 110. The rigid frame 314 prevents the keyboard overlay 110 from flexing too much and contacting the touch sensor 304 at multiple points. Many variations on the rigid frame 314 are possible. Some embodiments interpose a rigid element in every valley 310 between two key areas 300. Depending upon the flexibility of the keyboard overlay 110, other embodiments work with less extensive coverage.

Figure 4:
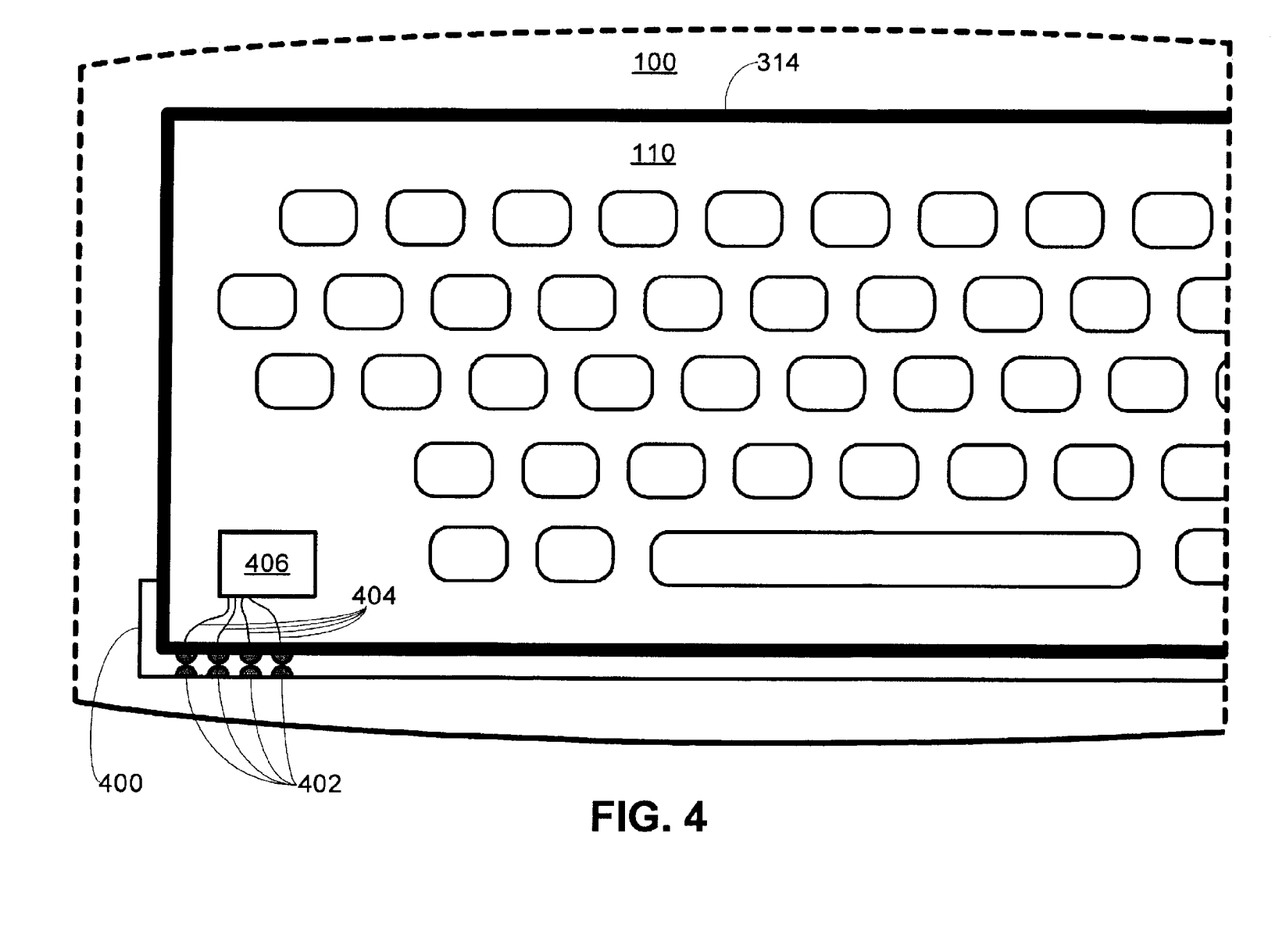
FIG. 4 is a schematic diagram of an exemplary connection of a keyboard overlay to a computing device.

A rigid frame 314 may also serve other purposes. FIG. 4 illustrates three related aspects of using the keyboard overlay 110: connecting the keyboard overlay 110 to the portable tablet 100, aligning the keyboard overlay 110 over the touch-sensitive display screen of the portable tablet 100, and detecting the presence and type of the keyboard overlay 110 by the portable tablet 100.

The simplest way to connect the keyboard overlay 110 is simply to lay it on top of a touch-sensitive display screen. When the keyboard overlay 110 is used with a portable tablet 100, a more secure connection may be more convenient. For example, the keyboard overlay 110 may be hinged to the body of the portable tablet 100 and swung into place when desired. In another embodiment, that of FIG. 4, a rigid frame 314 surrounds the periphery of the keyboard overlay 110. The rigid frame 314 slides into a slot 400 on the portable tablet 100.

A secure connection mechanism may also simplify aligning the keyboard overlay 110 over the touch-sensitive display screen. Alignment is possible without a secure connection, as when a user "eyeballs" a keycap icons painted on the display screen and visually lines up the keyboard overlay 110 so that its key areas 300 correspond to the painted keycap icons. Alignment may also be achieved by the connection slot 400: when the keyboard overlay 110 is slid fully into the slot 400, the keyboard overlay 110 is properly aligned over the display screen.

Along with connection and alignment, some embodiments provide a way for the portable tablet 100 to detect the presence and type of the keyboard overlay 110. Many known technologies are adaptable to detecting the presence of the keyboard overlay 110. To mention just a few examples: a dashpot is pressed when the keyboard overlay 110 is put in place, an optical sensor detects a change in light caused by the keyboard overlay 110, or an electronic sensor detects a change in capacitance caused by the presence of the keyboard overlay 110. FIG. 4 illustrates yet another possibility for electronic sensing. In FIG. 4, the contacts 402 on the portable tablet 100 and on the keyboard overlay 110 touch when the keyboard overlay 110 is placed fully into the connection slot 400. These contacts provide electrical power and signaling connections, via leads 404, to an electronic chip 406 embedded in the keyboard overlay 110. The portable tablet 100 reads from the chip 406 the type of the keyboard overlay 110. As discussed below in reference to FIG. 5a, the portable tablet 100 uses this type information to, for example, invoke an application program 220 associated with the particular type of keyboard overlay 110. If the keyboard overlay 110 represents an interface to a specific type of scientific calculator, then an appropriate calculator program may be invoked to accept the user's input. In place of, or in addition to, the chip 406, other embodiments include other active or passive electronic components (for example, wire jumpers or resistors).

Figure 5A:
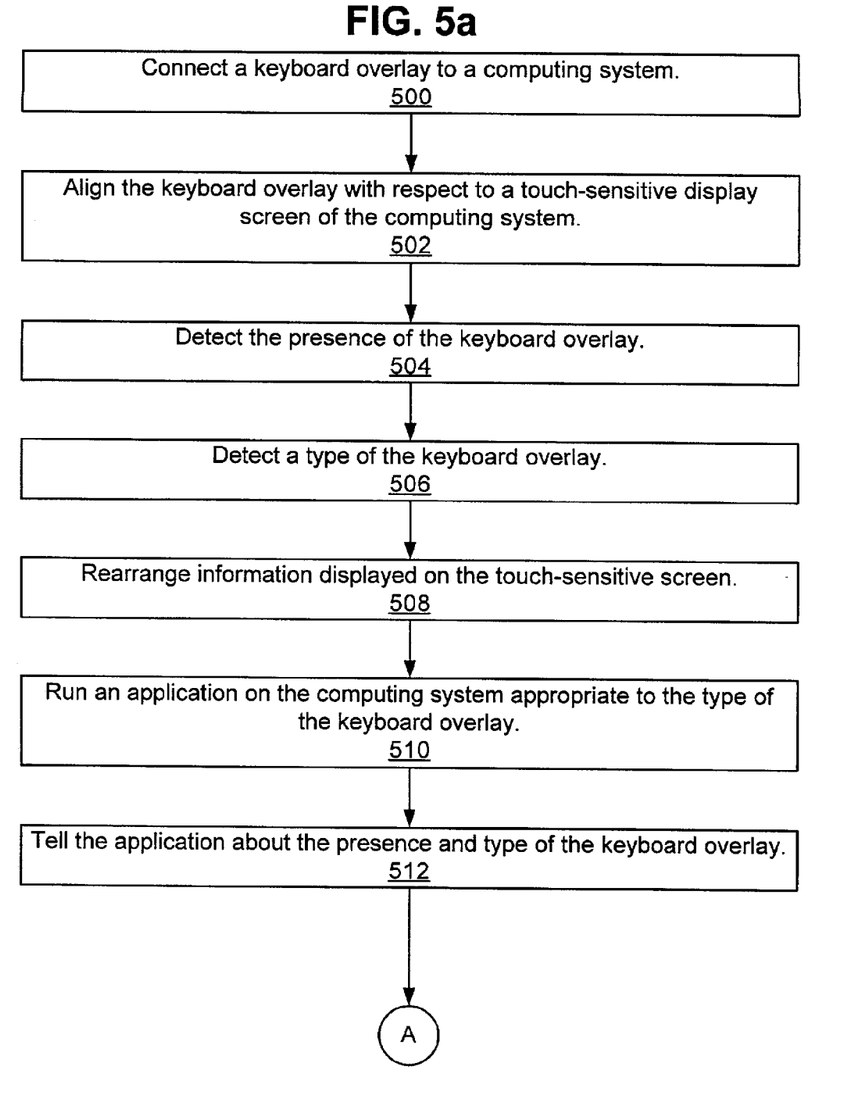
FIGS. 5a and 5b together form a flowchart of an exemplary method for using a keyboard overlay with a computing device.
Figure 5B:
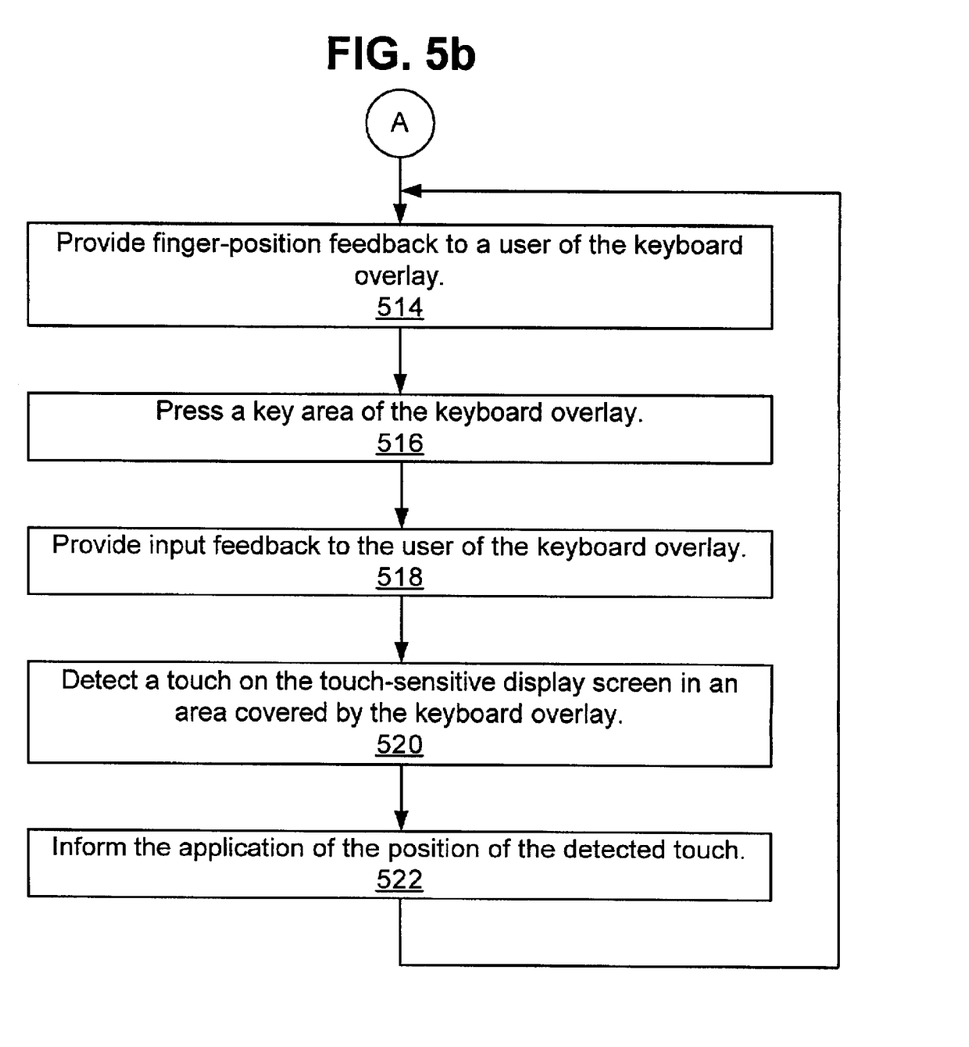

FIGS. 5a and 5b present a flowchart of exemplary steps performed when using a keyboard overlay 110. Note that many of the steps in these Figures are appropriate only to certain embodiments of the present invention. Details within each step also vary from embodiment to embodiment.

The flowchart begins in step 500 when the keyboard overlay 110 is connected to a computing system. As discussed above in reference to FIG. 4, in some embodiments connecting merely involves placing the keyboard overlay 110 on top of a touch-sensitive display screen. In other embodiments, a hinge connects the keyboard overlay 110 to the computing system or the keyboard overlay 110 slides into a connection track 400 provided by the computing system.

In step 502, the keyboard overlay 110 is properly aligned with respect to the touch-sensitive display screen. The keyboard overlay 110 is operable with computing systems that are not aware of its presence and that do not provide any special alignment aids. As discussed above in reference to FIG. 4, the user in this case visually aligns the key areas 300 of the keyboard overlay 110 over keycap icons painted by the computing system on its display screen. In other embodiments, alignment is achieved by physical means, possibly involving a secure connection mechanism. If the computing system is aware of the keyboard overlay 110, it can paint alignment indications on the display screen.

In some embodiments, the computing system becomes aware of the presence of the keyboard overlay 110 in step 504. Note that this step is not performed for "legacy" systems that were not designed with a keyboard overlay 110 in mind. Configuration software is added to some computing systems to allow a user to tell the computing system when a keyboard overlay 110 is in place. Some computing systems automatically sense the presence of the keyboard overlay 110, as discussed above in reference to FIG. 4.

Like step 504, detecting the type of the keyboard overlay 110 in step 506 is optional. The type of the keyboard overlay 110 can include such information as its size, whether or not the keyboard overlay is transparent, the arrangement of the key areas 300, keycap indications, if any, and the like. Methods for detecting the type of the keyboard overlay 110 parallel the methods discussed in reference to step 504 for detecting the presence of the keyboard overlay 110. Specific embodiments range from supporting no detection at all, to allowing a user to tell the computing system that a specific type of keyboard overlay 110 is present, to automatically detecting the type of keyboard overlay 110, such as by the use of an embedded electronic chip 406, as discussed above in reference to FIG. 4.

Some embodiments of the computing system take advantage, in step 508, of their knowledge of the presence and type of the keyboard overlay 110 to rearrange information displayed on the touch-sensitive display screen. For example, system warning messages and configuration menus are placed so that they do not lie under the keyboard overlay 110.

Building on its knowledge of the type of the keyboard overlay 110 gathered in step 506, some embodiments of the computing system invoke, in step 510, an application program 220 appropriate to this type of keyboard overlay 110. (Note that if the computing system is a portable tablet 100, then this step includes asking the host computing system 102 to run the appropriate application program 220.) This step encourages the use of application-specific keyboard overlays 110. For example, the keyboard overlay 110 is found to present menu-selection keys for a fast-food restaurant. An order-entry application program 220 is invoked, accepting menu orders typed in on the keyboard overlay 110, sending the orders to the food-preparation staff, and presenting the total cost of a customer's bill on the touch-sensitive display screen. Step 510 becomes more valuable as keyboard overlays 110 and application programs 220 are specifically designed to work with one another.

Figure 6A:
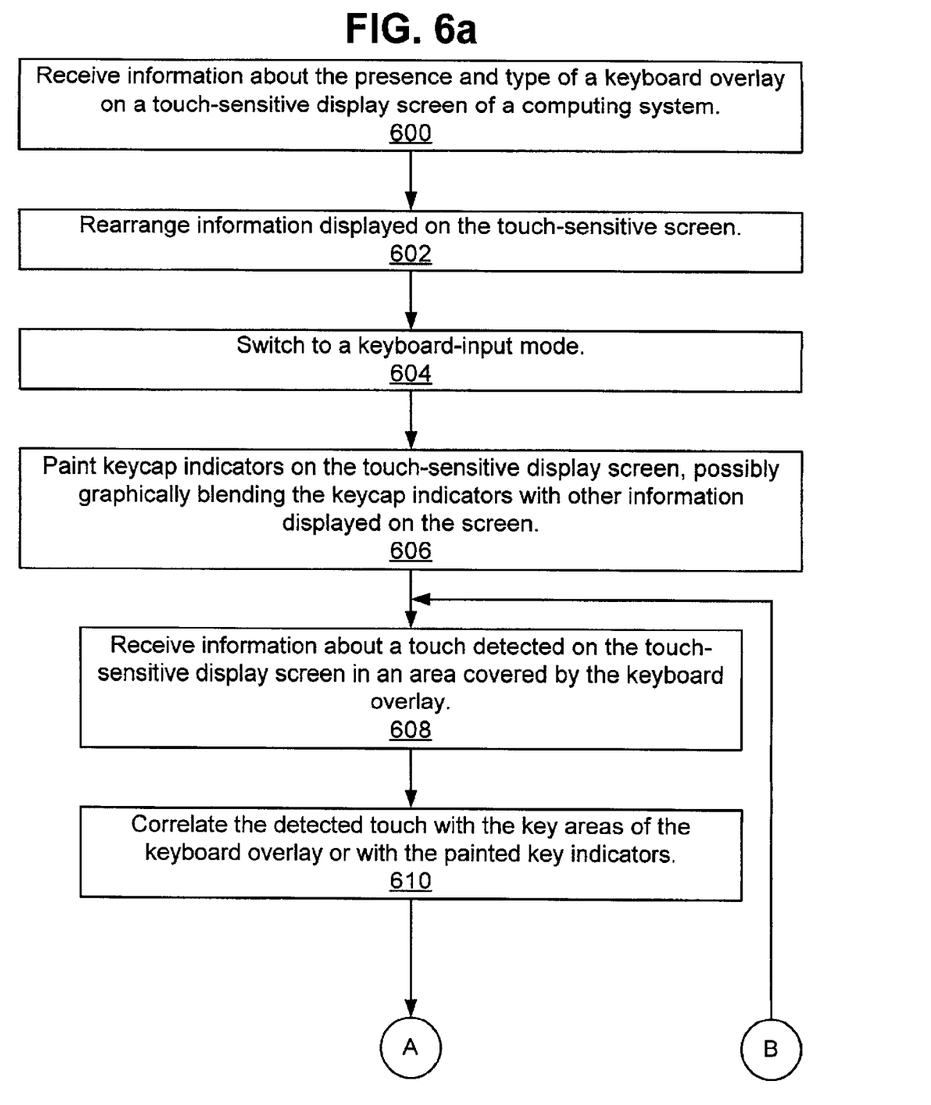
FIGS. 6a and 6b together form a flowchart of an exemplary method usable by an application for responding to the presence of a keyboard overlay.
Figure 6B:
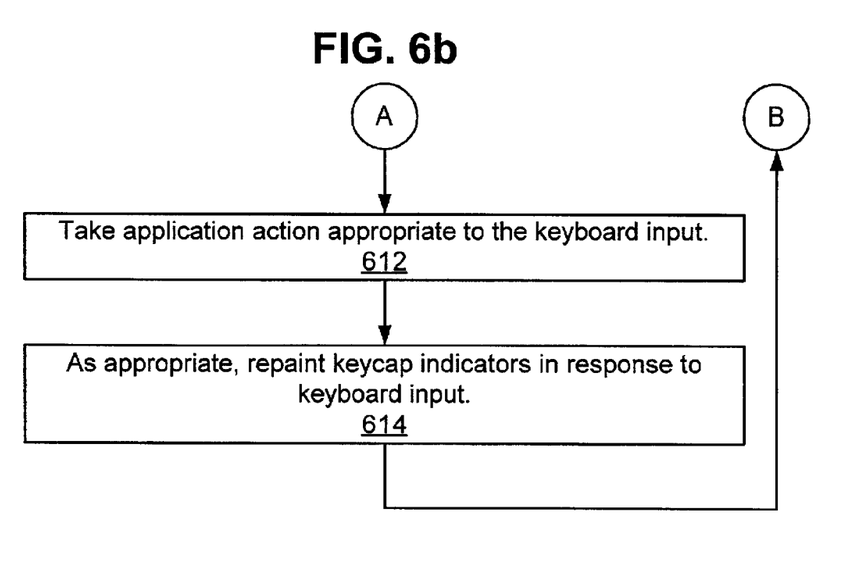

In step 512, the computing system tells the application program 220 that will accept input from the keyboard overlay 110 of the presence and type of the keyboard overlay 110. As with previous steps, embodiments of this step range a large range, from doing nothing at all in the case of an unaware legacy application program 220 to providing a full disclosure to an application program 220 specifically invoked (in step 510) to run with this type of keyboard overlay 110. FIGS. 6a and 6b, discussed below, present steps taken by an exemplary application program 220 when used with a keyboard overlay 110.

Steps 514 through 522 present a loop of exemplary steps taken when a user types on the keyboard overlay 110. In step 514, the physical structure of the keyboard overlay 110 provides feedback to the user so that the user can keep his fingers positioned properly over the keyboard overlay 110's key areas 300. The discussion of FIG. 3b presents a few examples of how this feedback is provided: a depressed crown on top of the key area 300, a ridge around the key area 300, and a valley 310 between key areas 300 and serving to tactilely distinguish one key area 300 from its neighbors. In any case, confident that his fingers are properly positioned, the user presses a key area 300 in step 516. The deformation of the key area 300 caused by the user's pressure provides feedback to the user in step 518 telling the user that the key area 300 has been pressed hard enough to generate a touch on the touch-sensitive display screen. The user's pressure is delivered to the display screen by a display actuator 306 and is detected by the touch-screen controller as a touch in step 520. As is well known in the art, the touch is directed to the application program 220 (or operating system utility) that is accepting input from the location on the display screen where the touch is detected. The location of the detected touch is passed to the application program 220 in step 522. The application program 220 processes the touch as appropriate.

FIGS. 6a and 6b present a flowchart of exemplary steps performed by an application program 220 responding to input from a keyboard overlay 110. Note that, as in the flowchart of FIGS. 5a and 5b, many of the steps in these Figures are appropriate only to certain embodiments of the present invention, and details within each step vary from embodiment to embodiment.

In step 600, the application program 220 is informed of the presence and type of a keyboard overlay 110. In response to that information, the application program 220, in step 602, rearranges the information that it displays on the touch-sensitive display screen, moving information to areas of the display screen not covered by this type of keyboard overlay 110. This is similar to the operating system's action in step 508 of FIG. 5a. Legacy application programs 220 are not aware of the keyboard overlay 110 and so do not perform steps 600 and 602.

Some application programs 220 have a special keyboard-input mode. When the keyboard overlay 110 is first detected, the application program 220 can take the presence of the keyboard overlay 110 as an indication that the user wishes to enter this mode.

If the application program 220 is unaware of the keyboard overlay 110, then it probably performs step 606, painting keycap icons on the touch-sensitive display screen, before the user aligns the keyboard overlay 110 over the keycap icons. This may be in response to the user pressing a button or performing some other action to bring up the virtual keyboard. Some keyboard-overlay-aware application programs 220 instead paint the keycap icons in response to the presence of the keyboard overlay 110. In some embodiments, the specific keycap icons painted and their arrangement depends upon the specific type of the keyboard overlay 110. The keycap icons may also depend upon configuration information set by the user. For example, the currency icon could be "$" in the United States and "¥" in Japan. Of course, keyboard-overlay-aware application programs 220 need not paint keycap icons if the keyboard overlay 110 is known to be opaque. For a pleasing aesthetic effect, the keycap icons are alpha-blended with whatever display information is already present on the display screen.

Steps 608 through 614 form a loop of exemplary steps performed by the application program 220 as the keyboard overlay 110 is used. In step 608, the application program 220 receives information about a touch detected by the touch sensor 304. As described above in reference to step 520 of FIG. 5b, detected touches are sent to the operating system utility or application program 220 responsible for processing input from the touch's location on the touch-sensitive display screen. Audible feedback can be sent to the user so that he knows that he hit a key area 300 hard enough to register a touch. In step 610, the application program 220 correlates the touch location with a specific key area 300 to determine, for example, that the user just typed a letter "J." In step 612, the application program 220 takes action appropriate to the specific key area 300 just touched. For example, the application program 220 appends a letter "J" to a text string being entered.

Step 614 presents a possibility when the keyboard overlay 110 is transparent. The keycap icons are repainted in response to user input. For example, when CAPS is pressed, upper case letters are shown. More specialized changes are possible and depend upon the nature of the application program 220.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details, such as arrangements of key areas and construction details, are determined by specific situations. Although the environment of the invention is described in terms of software modules or components, some processes may be equivalently performed by hardware components. Therefore, the invention as described herein contemplates all such embodiments as may come within the scope of the following claims and equivalents thereof.

We claim:

1. In a computing system comprising a touch-sensitive display screen, a method for using a keyboard overlay to provide input to the computing system, the method comprising:

connecting the keyboard overlay to the computing system, wherein connecting comprising removably connecting a connector on the keyboard overlay to a connector on the computing system;

receiving, by the keyboard overlay, pressure applied by a user of the computing system;

in response to receiving pressure, applying, by the keyboard overlay, pressure to the touch-sensitive display screen; and decoding, by the computing system, the pressure applied to the touch-sensitive display screen as input to the computing system.

2. The method of claim 1 wherein connecting comprises placing the keyboard overlay onto the touch-sensitive display screen.

3. The method of claim 1 wherein connecting further comprises aligning the keyboard overlay onto the touch-sensitive display screen.

4. The method of claim 1 wherein applying pressure to the touch-sensitive display screen comprises:

transmitting pressure applied by a user of the computing system to a display actuator of the keyboard overlay; and pressing the display actuator against the touch-sensitive display screen.

5. The method of claim 1 further comprising, in response to receiving pressure from a user of the computing system, supplying, by the keyboard overlay, tactile feedback to the user of the computing system.

6. The method of claim 1 further comprising detecting, by the computing system, a presence of the keyboard overlay.

7. In a computing system comprising a touch-sensitive display screen, a method for using a keyboard overlay to provide input to the computing system, the method comprising:

connecting the keyboard overlay to the computing system;

detecting, by the computing system, a presence of the keyboard overlay, wherein detecting a presence comprises alerting, by a user of the computing system, the computing system to the presence of the keyboard overlay;

receiving, by the keyboard overlay, pressure applied by a user of the computing system;

in response to receiving pressure, applying, by the keyboard overlay, pressure to the touch-sensitive display screen; and decoding, by the computing system, the pressure applied to the touch-sensitive display screen as input to the computing system.

8. The method of claim 6 wherein detecting a presence comprises alerting, by the computing system, an application running on the computing system of the presence of the keyboard overlay.

9. The method of claim 6 wherein detecting a presence comprises initiating, by the computing system, an application to run on the computing system.

10. The method of claim 6 wherein detecting a presence of the keyboard overlay comprises detecting a type of the keyboard overlay.

11. In a computing system comprising a touch-sensitive display screen, a method for using a keyboard overlay to provide input to the computing system, the method comprising:

connecting the keyboard overlay to the computing system;

detecting, by the computing system, a presence of the keyboard overlay, wherein detecting comprises detecting a type of the keyboard overlay, wherein detecting a type comprises alerting, by a user of the computing system, the computing system to the type of the keyboard overlay;

receiving, by the keyboard overlay, pressure applied by a user of the computing system;

in response to receiving pressure, applying, by the keyboard overlay, pressure to the touch-sensitive display screen; and decoding, by the computing system, the pressure applied to the touch-sensitive display screen as input to the computing system.

12. In a computing system comprising a touch-sensitive display screen, a method for using a keyboard overlay to provide input to the computing system, the method comprising:

connecting the keyboard overlay to the computing system;

detecting, by the computing system, a presence of the keyboard overlay, wherein detecting comprises detecting a type of the keyboard overlay, wherein detecting a type comprises alerting, by the computing system, an application running on the computing system of the type of the keyboard overlay;

receiving, by the keyboard overlay, pressure applied by a user of the computing system;

in response to receiving pressure, applying, by the keyboard overlay, pressure to the touch-sensitive display screen; and decoding, by the computing system, the pressure applied to the touch-sensitive display screen as input to the computing system.

13. The method of claim 10 wherein detecting a type comprises initiating, by the computing system, an application to run on the computing system.

14. The method of claim 10 wherein detecting a type of the keyboard overlay comprises:

supplying power to an electronic component of the keyboard overlay; and reading a keyboard overlay type identifier from the electronic component of the keyboard overlay.

15. The method of claim 6 further comprising, in response to detecting a presence of the keyboard overlay, altering, by the computing system, information displayed on the touch-sensitive display screen.

16. In a computing system comprising a touch-sensitive display screen, a method for using a keyboard overlay to provide input to the computing system, the method comprising:

connecting the keyboard overlay to the computing system;

detecting, by the computing system, a presence of the keyboard overlay;

in response to detecting a presence of the keyboard overlay, altering, by the computing system, information displayed on the touch-sensitive display screen, wherein altering displayed information comprises displaying keycap indicators on the touch-sensitive display screen below the keyboard overlay;

receiving, by the keyboard overlay, pressure applied by a user of the computing system;

in response to receiving pressure, applying, by the keyboard overlay, pressure to the touch-sensitive display screen; and decoding, by the computing system, the pressure applied to the touch-sensitive display screen as input to the computing system.

17. The method of claim 16 wherein displaying keycap indicators comprises graphically blending keycap indicators with other information displayed on the touch-sensitive display screen.

18. The method of claim 16 further comprising, in response to decoding the pressure applied to the touch-sensitive display screen as input to the computing system, displaying altered keycap indicators on the touch-sensitive display screen below the keyboard overlay.

19. A computer-readable medium containing instructions for performing a method for using a keyboard overlay to provide input to a computing system, the computing system comprising a touch-sensitive display screen, the method comprising:

connecting the keyboard overlay to the computing system, wherein connecting comprising removably connecting a connector on the keyboard overlay to a connector on the computing system;

receiving, by the keyboard overlay, pressure applied by a user of the computing system;

in response to receiving pressure, applying, by the keyboard overlay, pressure to the touch-sensitive display screen; and decoding, by the computing system, the pressure applied to the touch-sensitive display screen as input to the computing system.

20. In a computing system comprising a touch-sensitive display screen, a method for an application running on the computing system to respond to input provided to the computing system by a physical keyboard overlay, the method comprising:

detecting a presence of the physical keyboard overlay; and in response to detecting a presence of the physical keyboard overlay, altering information displayed by the application on the touch-sensitive display screen, wherein altering displayed information comprises displaying keycap indicators on the touch-sensitive display screen below the physical keyboard overlay.

21. The method of claim 20 wherein displaying keycap indicators comprises graphically blending keycap indicators with other information displayed by the application on the touch-sensitive display screen.

22. The method of claim 20 further comprising, in response to input provided by the physical keyboard overlay, displaying altered keycap indicators on the touch-sensitive display screen below the physical keyboard overlay.

23. In a computing system comprising a touch-sensitive display screen, a method for an application running on the computing system to respond to input provided to the computing system by a physical keyboard overlay, the method comprising:

detecting a presence of the physical keyboard overlay; and in response to detecting a presence of the physical keyboard overlay, altering information displayed by the application on the touch-sensitive display screen; and in response to input provided by the physical keyboard overlay, providing audible feedback.

* * * * *